(12) United States Patent
Jones et al.

(10) Patent No.: US 10,298,142 B2
(45) Date of Patent: May 21, 2019

(54) POWER CONVERSION TECHNIQUES

(71) Applicant: THX Ltd., San Francisco, CA (US)

(72) Inventors: Owen Jones, Ipswich (GB); Andrew Mason, Bolton (CA); Lawrence R. Fincham, Santa Rosa, CA (US)

(73) Assignee: THX Ltd., San Francisco, CA (US)

( * ) Notice: Subject to any disclaimer, the term of this patent is extended or adjusted under 35 U.S.C. 154(b) by 0 days.

(21) Appl. No.: 14/873,043

(22) Filed: Oct. 1, 2015

(65) Prior Publication Data

US 2016/0099657 A1 Apr. 7, 2016

Related U.S. Application Data

(60) Provisional application No. 62/059,067, filed on Oct. 2, 2014.

(51) Int. Cl.
| | |
|---|---|
| *H02M 1/14* | (2006.01) |
| *H02M 7/06* | (2006.01) |
| *H02M 3/337* | (2006.01) |

(52) U.S. Cl.
CPC .............. *H02M 7/06* (2013.01); *H02M 1/14* (2013.01); *H02M 3/337* (2013.01)

(58) Field of Classification Search
CPC ...................................................... H02M 7/06
USPC ....................................................... 363/126
See application file for complete search history.

(56) References Cited

U.S. PATENT DOCUMENTS

| | | | | |
|---|---|---|---|---|
| 3,614,616 A | * | 10/1971 | Bucek | G01P 3/46 324/165 |
| 8,576,592 B2 | | 11/2013 | Jones et al. | |
| 2010/0128498 A1 | * | 5/2010 | Nymand | H02M 3/335 363/17 |
| 2011/0127976 A1 | | 6/2011 | Hiltbrunner et al. | |
| 2012/0026754 A1 | * | 2/2012 | Ye | H02M 3/285 363/17 |
| 2014/0361810 A1 | * | 12/2014 | Sasabe | H04L 25/0274 326/63 |
| 2015/0229225 A1 | * | 8/2015 | Jang | H02M 3/285 363/17 |

FOREIGN PATENT DOCUMENTS

| | | |
|---|---|---|
| CN | 201830144 U | 5/2011 |
| KR | 20140004968 A | 1/2014 |
| KR | 20140086271 A | 7/2014 |

OTHER PUBLICATIONS

International Search Report and the Written Opinion of the International Searching Authority for PCT/US2015/053735 dated Jan. 15, 2016.

* cited by examiner

*Primary Examiner* — Jue Zhang
*Assistant Examiner* — Trinh Q Dang
(74) *Attorney, Agent, or Firm* — Ben J. Yorks; Irell & Manella, LLP

(57) ABSTRACT

A power supply that includes a first current generator circuit that is coupled to a first transformer and generates a first waveform and a second current generator circuit that is coupled to a second transformer, and generates a second waveform that is out of phase with the first waveform. The first and second waveforms are rectified and combined into a DC output signal. The power supply includes a first coupling circuit that couples the first current generator circuit to the first transformer and a second coupling circuit that couples the second current generator circuit to the second transformer.

11 Claims, 13 Drawing Sheets

POWER CONVERSION TECHNIQUES

RELATED APPLICATION INFORMATION

This application claims the benefit of U.S. Provisional Application Ser. No. 62/059,067 filed on Oct. 2, 2014.

BACKGROUND OF THE INVENTION

1. Field of the Invention

The subject matter disclosed generally relates to electrical power supplies.

2. Background Information

U.S. Pat. No. 8,576,592 discloses various power supply circuits that create DC power with very little ripple. FIG. 1 shows an embodiment of the low ripple power supply disclosed in the '592 patent, that is also referred to an Euler power converter. The power supply includes a pair of transformers 10 and 12 that are connected to bridge rectifiers 14 and 16. The transformers 10 and 12 each include a center tap Vs. The outputs of the bridge rectifiers 14 and 16 are combined at a load 18 (C1 and RL1). Transformer 10 is coupled to a pair of FET transistors 20 and 22 that are driven by wideband operational amplifiers 24 and 26. Likewise, transformer 12 is coupled to a pair of FET transistors 28 and 30 that are driven by wideband operation amplifiers 32 and 34. The input waveforms to the operational amplifiers and the resultant waveforms at the secondary windings of the transformers 10 and 12 are shown in FIG. 1. The form of the input waveforms are such that the secondary current waveforms provided by the transformers 10 and 12 are 90 degrees out of phase. The secondary waveforms are combined at the load 18 such that the resultant waveform provide a DC power supply with very little ripple. The low ripple removes the requirement for any storage capacitors, thereby allowing for less parts and a smaller power supply.

The input waveforms cause the transistors for each transformer 10 and 12 to sequentially turn ON an OFF. For example, when transistor 20 is ON transistor 22 is OFF. Likewise, when transistor 22 is ON transistor 20 is OFF. When one of the transistors is initially turned off the voltage across the primary winding of the transformer will combine with the rail voltage Vs such that there is double the voltage at the drain terminal of the transistor. This high voltage requires the use of high voltage transistors. It would be desirable to reduce the voltage requirement of the transistors.

BRIEF SUMMARY OF THE INVENTION

A power supply that includes a first current generator circuit that is coupled to a first transformer and generates a first waveform, and a second current generator circuit that is coupled to a second transformer and generates a second waveform that is out of phase with the first waveform. The first and second waveforms are rectified and combined into a DC output signal. The power supply includes a first coupling circuit that couples the first current generator circuit to the first transformer and a second coupling circuit that couples the second current generator circuit to the second transformer.

DETAILED DESCRIPTION

Disclosed is a power supply that includes a first current generator circuit that is coupled to a first transformer and generates a first waveform and a second current generator circuit that is coupled to a second transformer and generates a second waveform that is out of phase from with the first waveform. The first and second waveforms are rectified and combined into a DC output signal. The power supply includes a first coupling circuit that couples the first current generator circuit to the first transformer and a second coupling circuit that couples the second current generator circuit to the second transformer. The switching circuits can reduce an operating voltage on transistors within the current generator circuits. Having separate switching and current generating circuits allows for optimization of the two different operations and also allows regulation control circuitry to be associated with the current control circuitry without having to cross the transformer isolation boundary.

Figure 2:
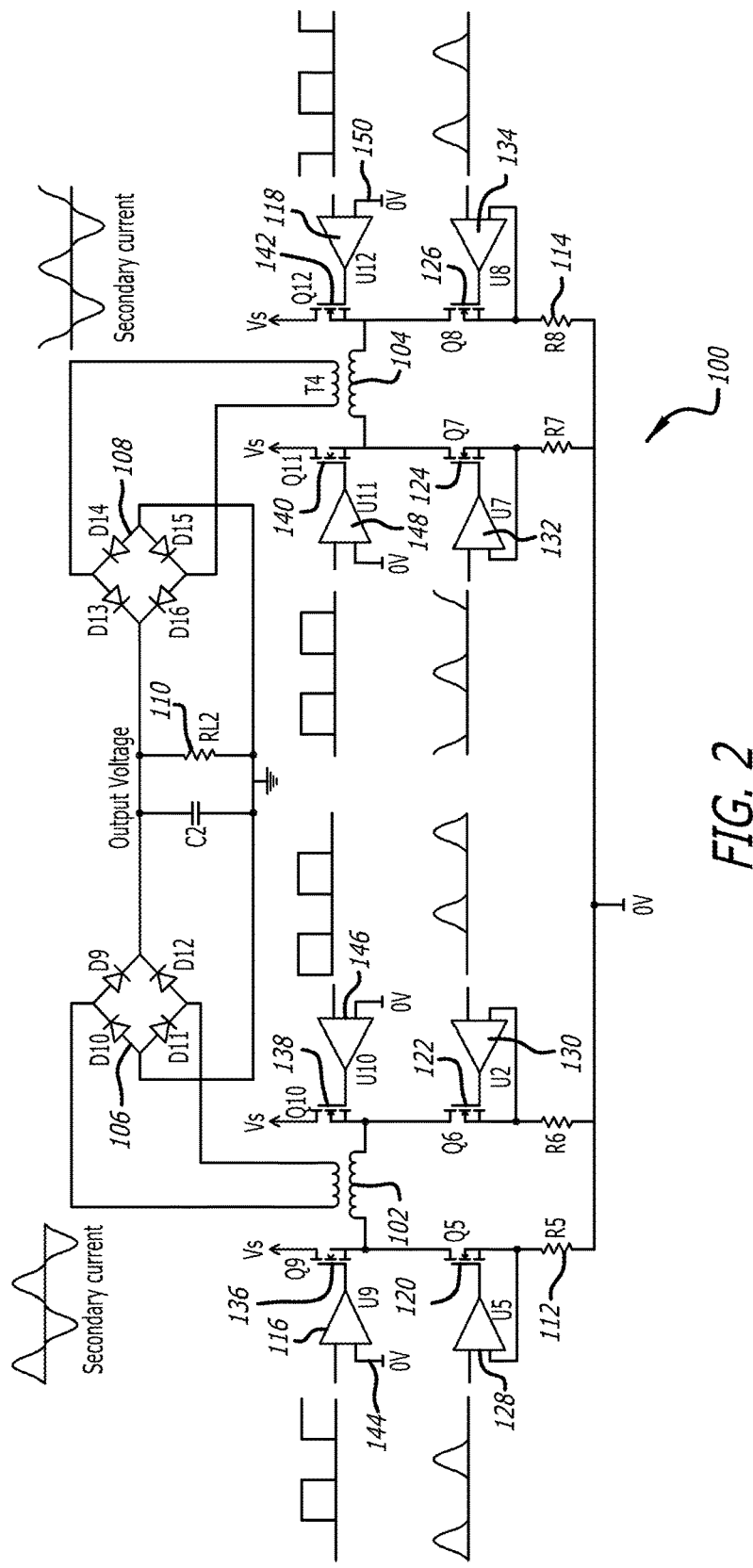
FIG. 2 is a schematic of an embodiment of a power supply of the present invention.

Referring to the drawings more particularly by reference numbers, FIG. 2 shows an embodiment of a power supply 100 of the present invention. The power supply 100 includes transformers 102 and 104 that are coupled to rectifiers 106 and 108, respectively. The outputs of the rectifiers 106 and 108 are combined at a load 110 (C2 and RL2). Each transformer 102 and 104 is coupled to current generator circuits 112 and 114, respectively, and coupling circuits 116 and 118, respectively. The current generator circuits 112 and 114 include FET transistors 120, 122, 124 and 126 and operational amplifiers 128, 130, 132 and 134. The coupling circuits 116 and 118 include FET transistors 136, 138, 140 and 142 and operational amplifiers 144, 146, 148 and 150. The transistors 136, 138, 140 and 142 are connected to a rail voltage Vs.

Figure 1:
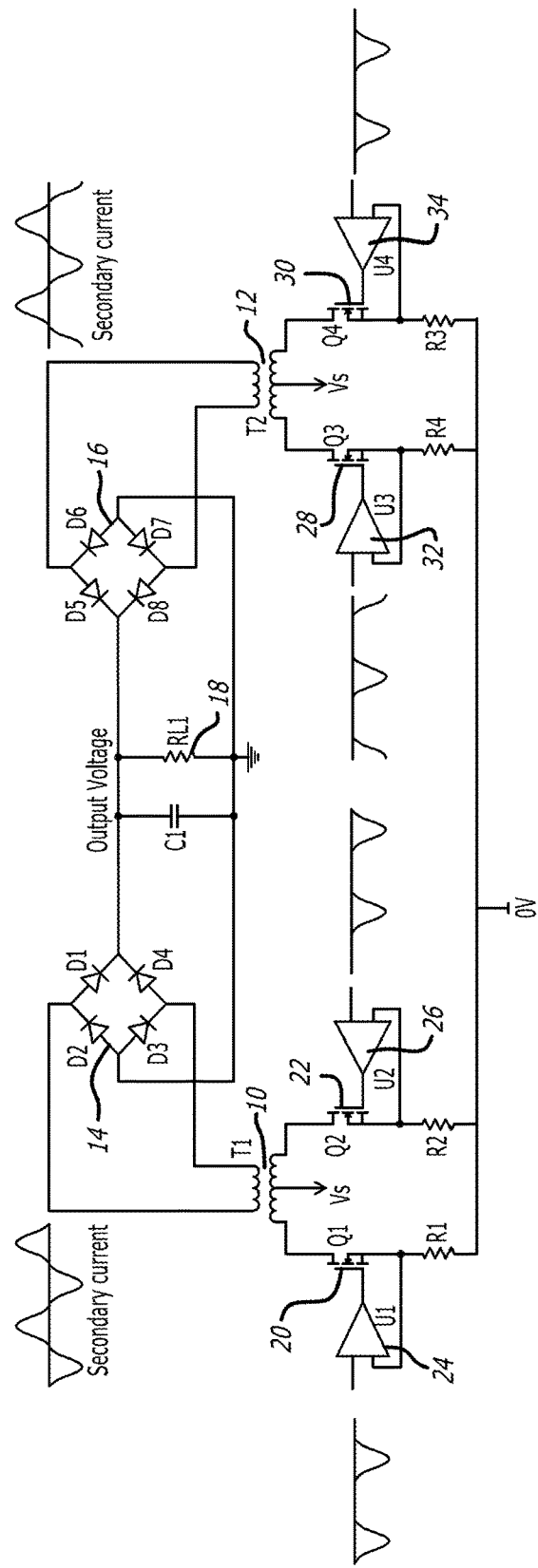
FIG. 1 is a schematic of a power supply of the prior art.

FIG. 2 shows the input waveforms for the current generating circuits 112 and 114 and coupling circuits 116 and 118. The input waveforms are generated by waveform generators (not shown). The input waveforms have relative phases such that in one state transistors 122 and 136 are ON and transistors 120 and 138 are OFF. In this state current flows through the ON transistors 122 and 136 and the primary winding of the transformer 102. The input waveforms then turn transistors 120 and 138 ON and transistors 122 and 136 OFF. The shape of the waveform at the transformer being defined by the linear current control transistors 120 and 122. Because the transistors 136 and 138 are connected to the rail voltage Vs the voltage across the OFF transistor when switched is Vs, which is one-half the voltage seen by the transistors in the prior art power supply shown in FIG. 1. This circuit thus reduces the voltage requirement of the transistors.

Current generator circuit 114 and coupling circuit 118 operate in like manner wherein transistors 126 and 140 are ON while transistors 124 and 142 are OFF and then switched such that transistors 124 and 142 are ON and transistors 126 and 140 are OFF. The input waveforms have relative phases such that the output waveforms of the rectifiers 106 and 108 are 180 degrees out of phase. The outputs are combined at the load 110 so that the result is a DC output with little ripple.

This arrangement has one other aspect that widens its application—the functions of voltage control and current control of the transformer have now been separated, at least in part. It is this realisation that leads to the notion of the current in the DC-DC converter being defined not by means of a current output amplifier, but by means of a controlling impedance within the converter and hence the concept of a Controlling Euler or ContrEuler.

In reality, a semiconductor device configured as a linear amplifier is in reality a controlling impedance as it determines the flow of current from the DC supply but usually these two aspects of amplification and control are conflated. By separating them out, other ways to implement the DC-DC converter become possible.

Figure 3:
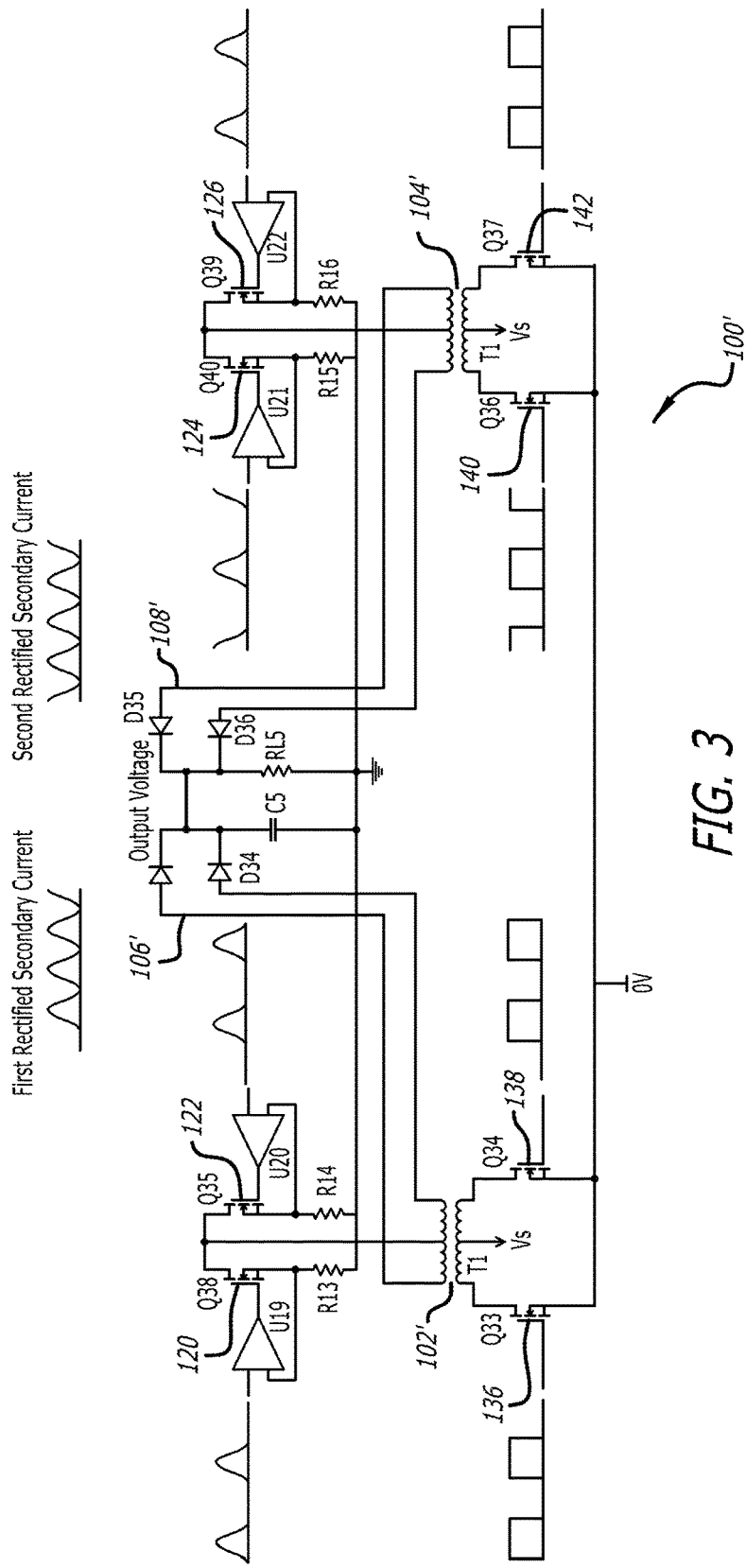
FIG. 3 is a schematic of an alternate embodiment of the power supply.
Figure 4A:
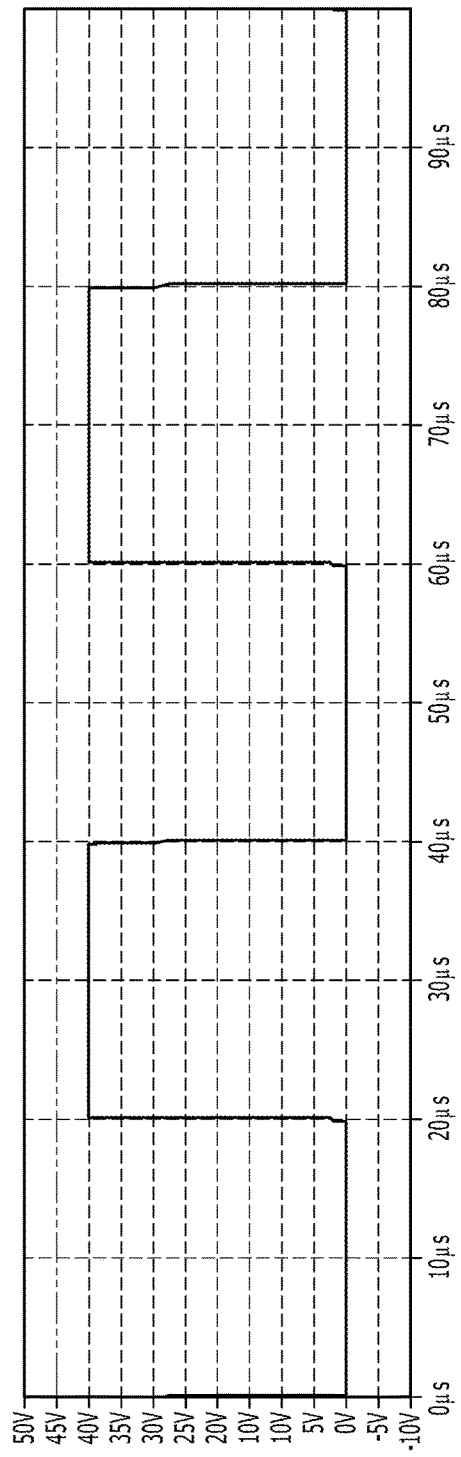
FIGS. 4A-G are graphs showing the waveforms at various points of the power supply.
Figure 4B:
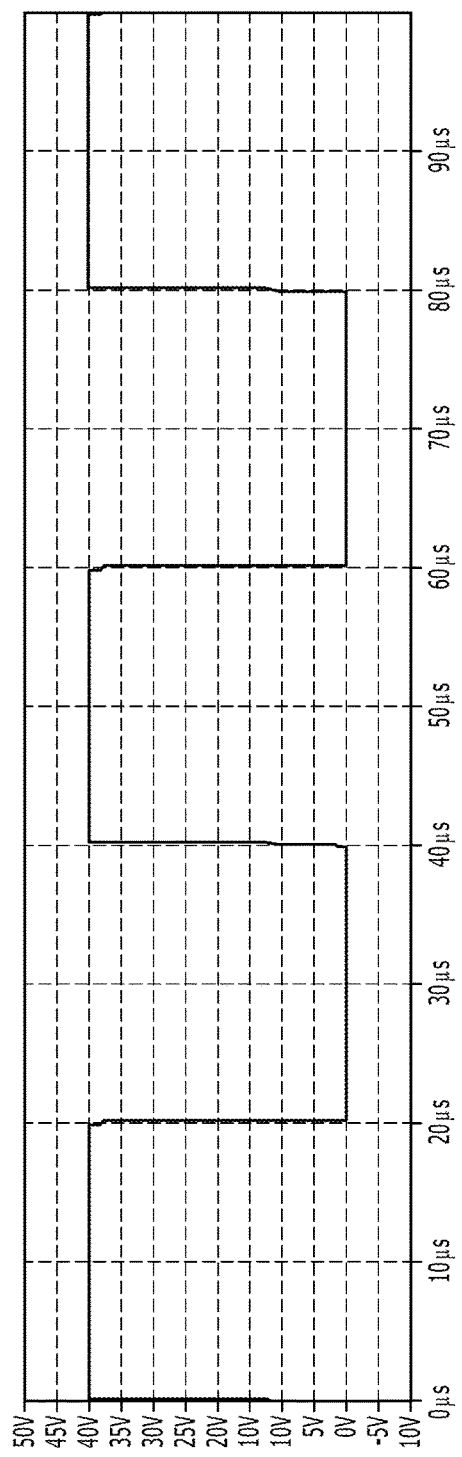
Figure 4C:
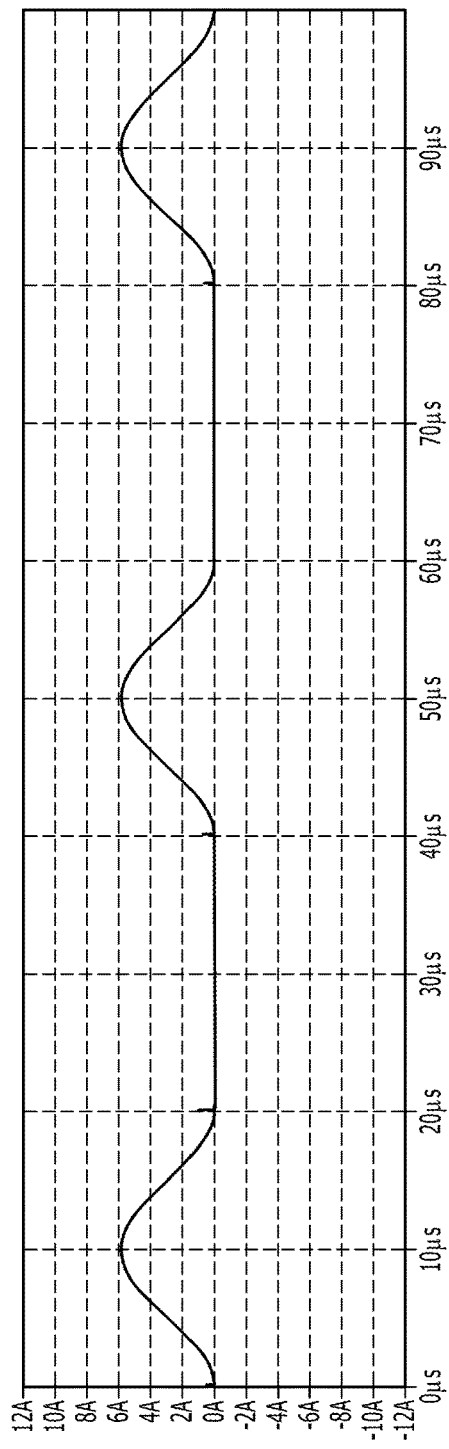
Figure 4D:
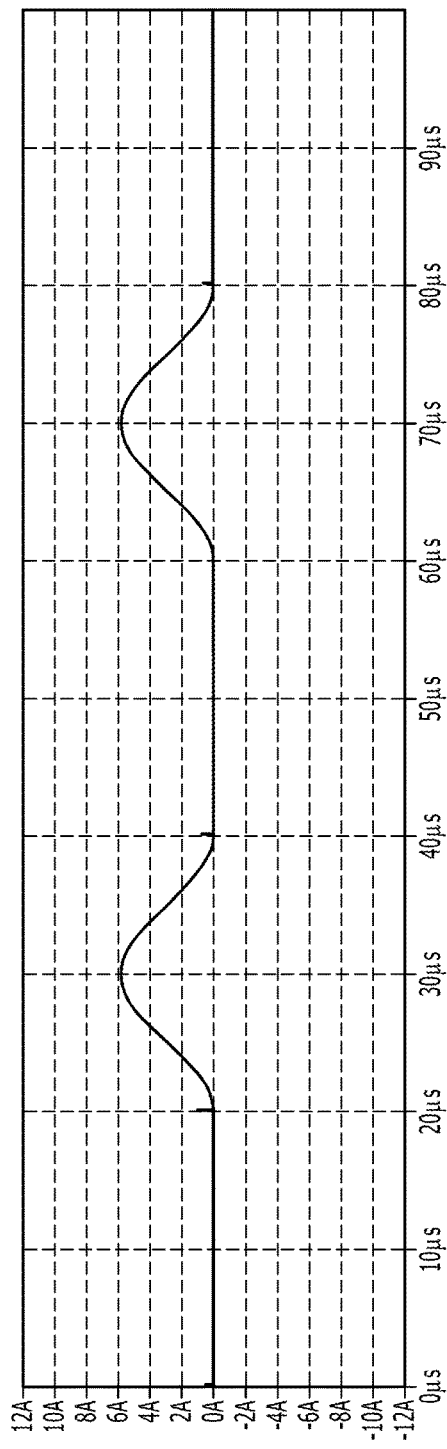
Figure 4E:
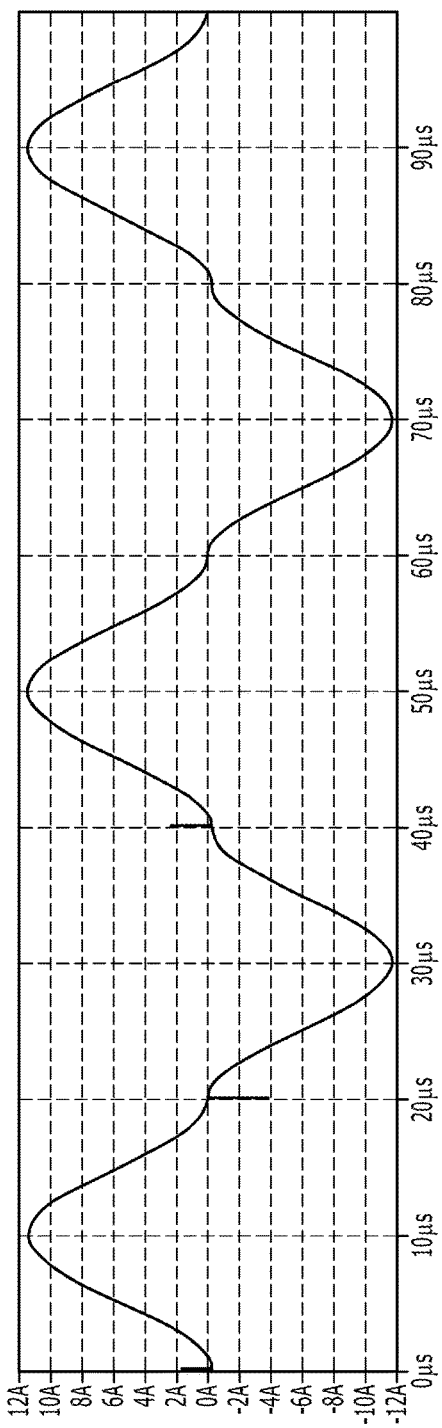
Figure 4F:
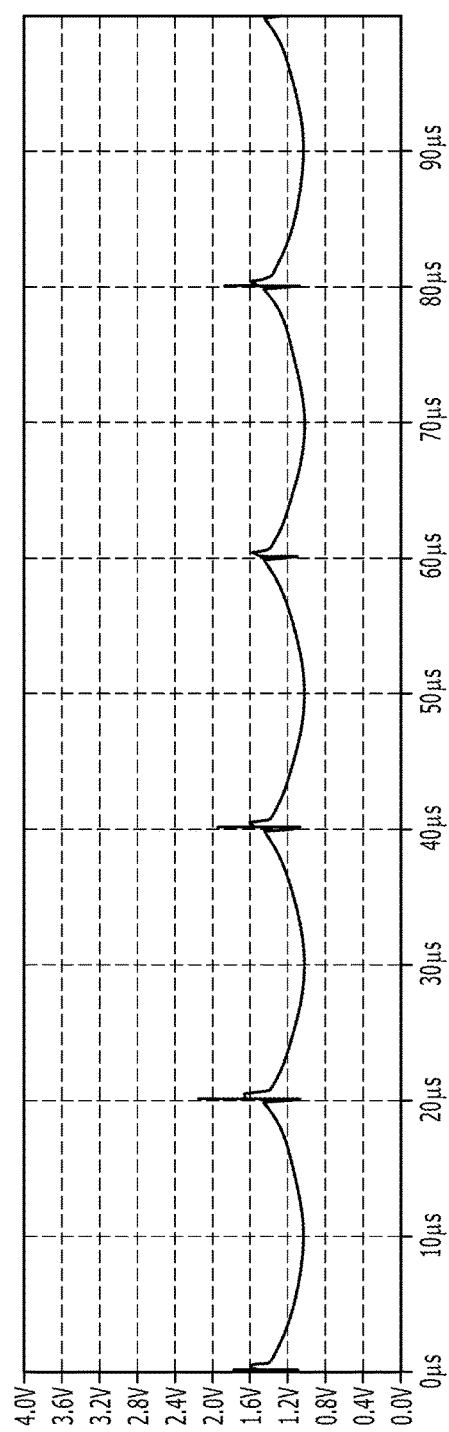
Figure 4G:
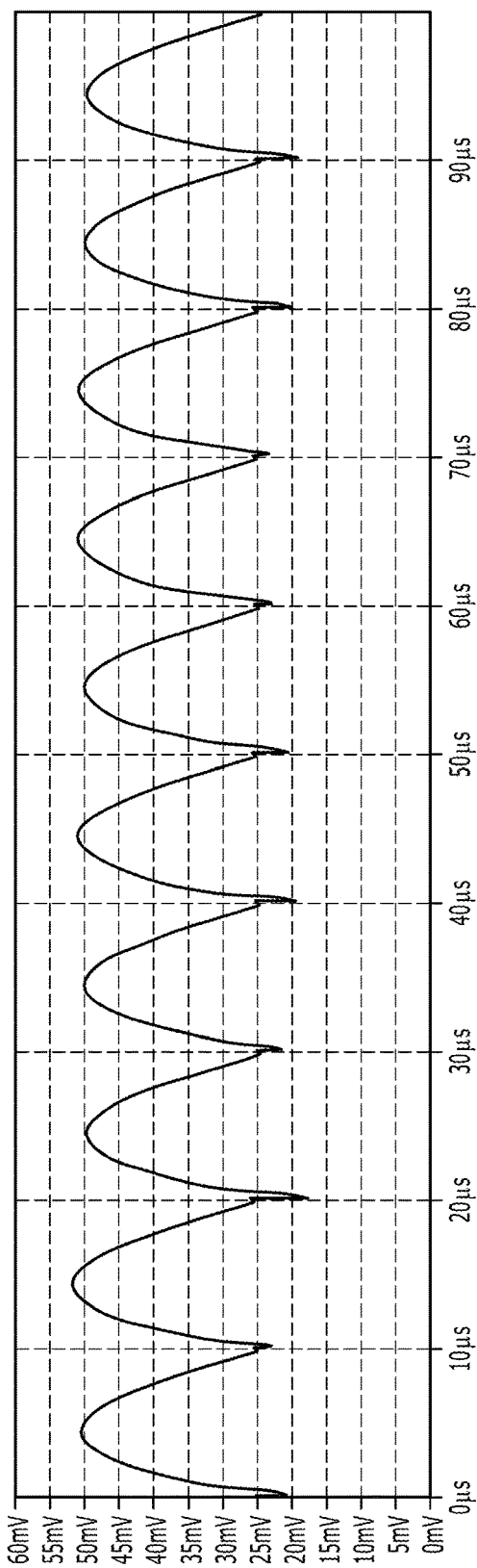

FIG. 3 shows an alternate embodiment 100' of the power supply. In this embodiment the current generator circuits 112 and 114 are coupled to the secondary windings of the transformers 102' and 104'. The transformers 102' and 104' include center taps on the primary windings. The rectifiers 106' and 108' each include a pair of diodes. The input waveforms are shown and have a relative phase such that the transistors 120, 122, 124, 126, 136, 138, 140 and 142 switch in the same manner is described with respect to FIG. 2. The secondary circuit may have lower voltages so placement of the current generator circuits 112 and 114 on the secondary side of the power supply may result in lower voltage requirements.

Although the input and output grounds are shown as common in this example, this need not be the case. Switches 136, 138, 140 and 142 control the connections of the transformer primary side. In this example a centre tapped primary is shown with push-pull switching for simplicity, but a half or a full bridge could be used instead to remove the need for the centre tap and reduce the voltage requirements on the switches.

The system current control is thus accomplished on the secondary of the transformer where the voltages may be lower. Additionally, it may be more advantageous for the current control circuitry to be on the same side of the transformer as the output voltage regulation circuit.

FIGS. 4A-G show various waveforms of the power supply 100'. The voltages at the drains of the primary side FET transistors 136 and 138 are plotted along with the currents through secondary side control transistors 120 and 122. In addition, the total primary side current in transformer 102 is shown. Also plotted is the drain voltages of the control transistors 120 and 122 and the output voltage ripple. The current control FET drain voltages of transistors 120 and 122 are of interest. The voltage across 120, 122, 124 and 126 remain low throughout the operating cycle. This means that very low voltage FETs can be used, optimised for linear control characteristics rather than high voltage switching characteristics. The voltage ratings of the FETs would however have to be such that they could handle any mismatch between actual output voltage delivered to the load and the optimum voltage determined from the input voltage and the transformer turns ratio. The low voltage across the control transistors also leads to a high efficiency for the DC-DC conversion process.

In this particular example, the output is a negative DC voltage so that N-ch FETs can be used. The output voltage is essentially ripple free with ideal transformer and rectifiers even without any output smoothing capacitor or filter. With practical components, the ripple is still extremely low, amounting to <0.1% in this example for a 38V/110 W output using just 1.1 uF of total effective capacitance.

The drain currents of the two current control FETs per transformer (e.g. 120 and 122) are added together to produce the total control current waveform since they are in parallel. This is just one particular implementation however, used to illustrate the development of the secondary side control element from the basic circuit of FIG. 2. Instead, just one FET could be used, appropriately driven to define a raised cosine control current.

The system currents can be seen to have the desired characteristics—the raised cosine secondary current is converted to an Euler current in the primary. The primary voltages are also seen to be square and thus the primary side circuit is efficient.

The current control FET Drain voltages are also of interest. The voltage across transistors 120/122 and 124/126 remains low throughout the operating cycle. This means that very low voltage FETs can be used, optimised for linear control characteristics rather than high voltage switching characteristics. Their voltage ratings would however have to be such that they could handle any mismatch between actual output voltage delivered to the load and the optimum voltage determined from the input voltage and the transformer turns ratio. The low voltage across the control transistors also leads to a high efficiency for the DC-DC conversion process.

Figure 5:
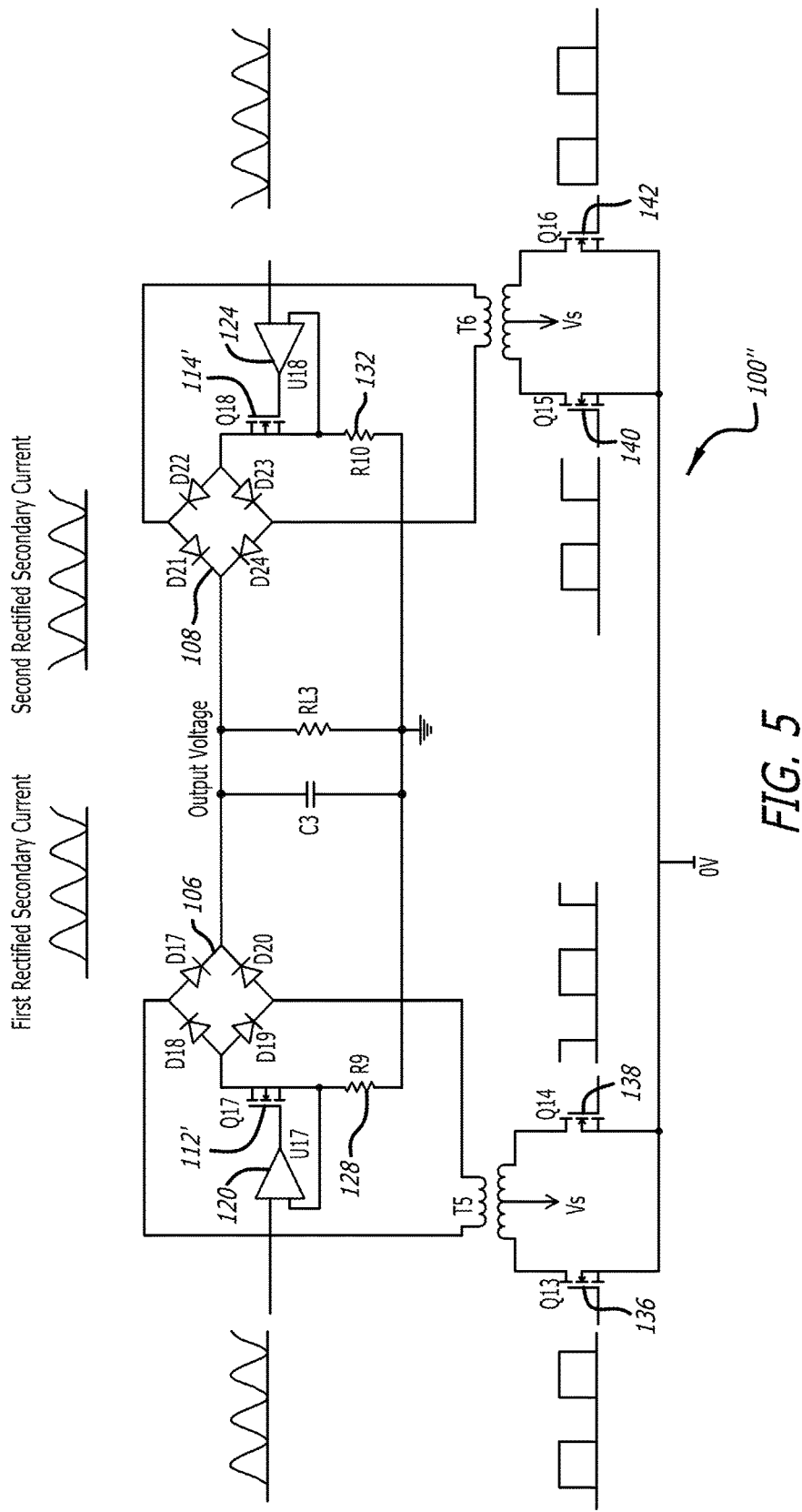
FIG. 5 is a schematic of another alternative embodiment of the power supply.

FIG. 5 is another alternate embodiment 100" of the power supply wherein the current generator circuits 112" and 114" are coupled to the secondary windings and each only have one transistor 120 and 124 and operational amplifier 128 and 132. The transistors 120 and 124 connect the ground of the rectifiers 106 and 108 to system ground. The input waveforms are such that the power supply operates in a similar manner to the power supply shown in FIG. 3. The output phase is altered to provide a positive output voltage. Unlike the power supply shown in FIG. 3 the supply shown in FIG. 5 does not require a secondary winding center tap.

The ContrEuler arrangements shown in these schematics have concentrated on the basic arrangement of signal generation and control. As such, the output from the secondary side of the DC-DC converter is in the form of a current applied to the load. Usually an output voltage is required that is largely independent of the applied load impedance. To achieve this load independent output, a voltage feedback control loop can be applied that senses output voltage and generates an error voltage to control the amplitude of the current control waveform (for example, the voltage applied to the inputs of amplifiers 128 and 132). This error detection and control loop is implemented solely on the secondary side of the transformer. There is no need for an error signal to be transmitted across the isolation barrier formed by transformers so the control loop can have increased bandwidth and linearity compared to that of a conventional DC-DC converter.

Figure 6:
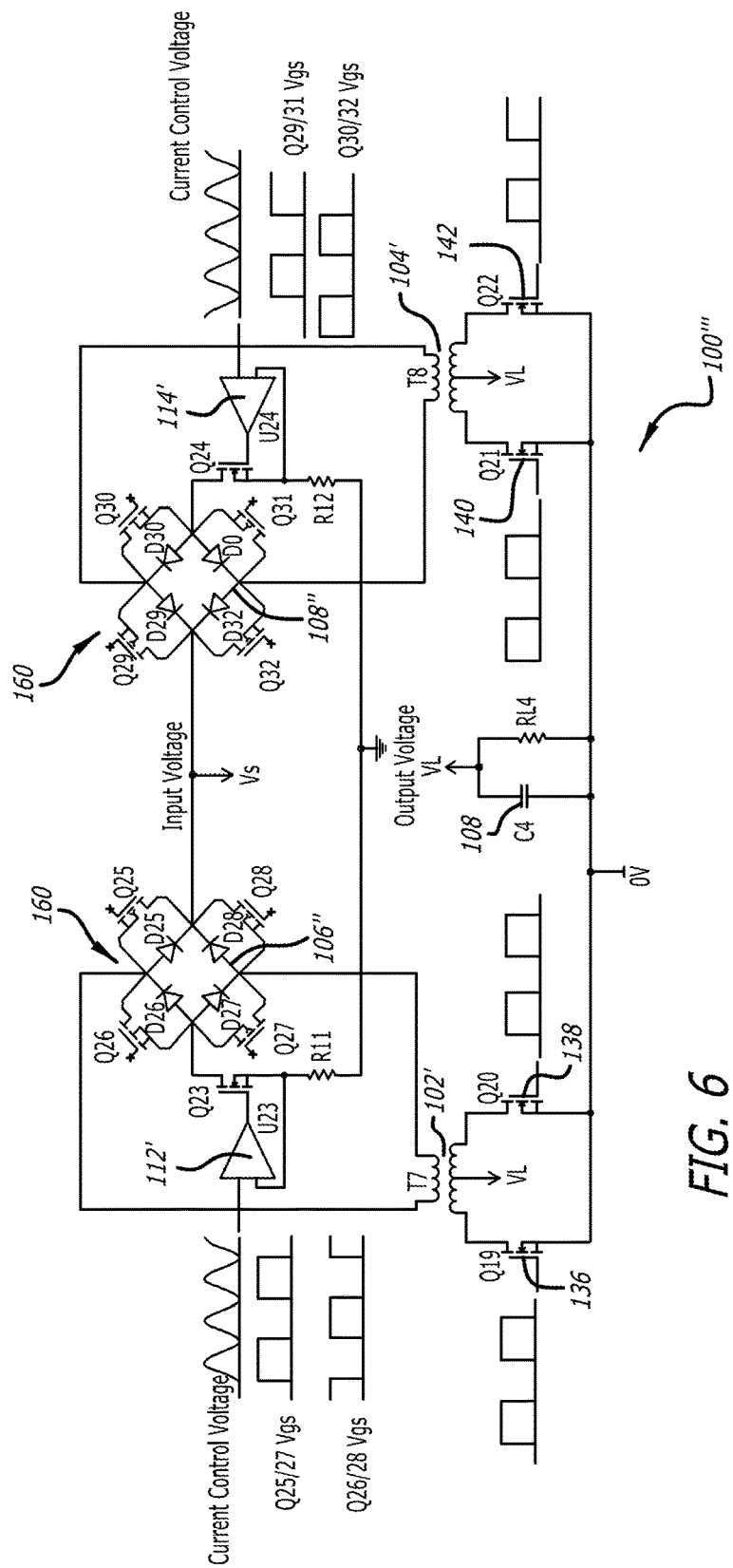
FIG. 6 is a schematic of another alternative embodiment of the power supply.

FIG. 6 is another alternate embodiment 100''' of the power supply, wherein the rectifiers 106" and 108" includes switches 160. The load 108 is also located in the primary side of the circuit. If a source of energy is connected to the secondary side of the circuit, then with suitable adjustment of the timing of the control voltages to primary side switches 136, 138, 140 and 142 a ripple free DC output can be obtained at the centre-tap of transformers 102' and 104'.

Thus this active rectifier version of the Euler implementation can be used in either forward mode to convert a source of DC power on the primary side, to a source of power at a different voltage on the secondary side to power a secondary-side load, or vice-versa if the source of power is on the secondary side. This feature is of use for example in regenerative braking applications where power is normally applied to a motor on the secondary side but where under breaking conditions the motor effectively becomes a generator and it is desirable to return power to the battery on the primary side. The conversion in both directions will be ripple free on both the input and output sides of the DC-DC conversion.

Figure 7:
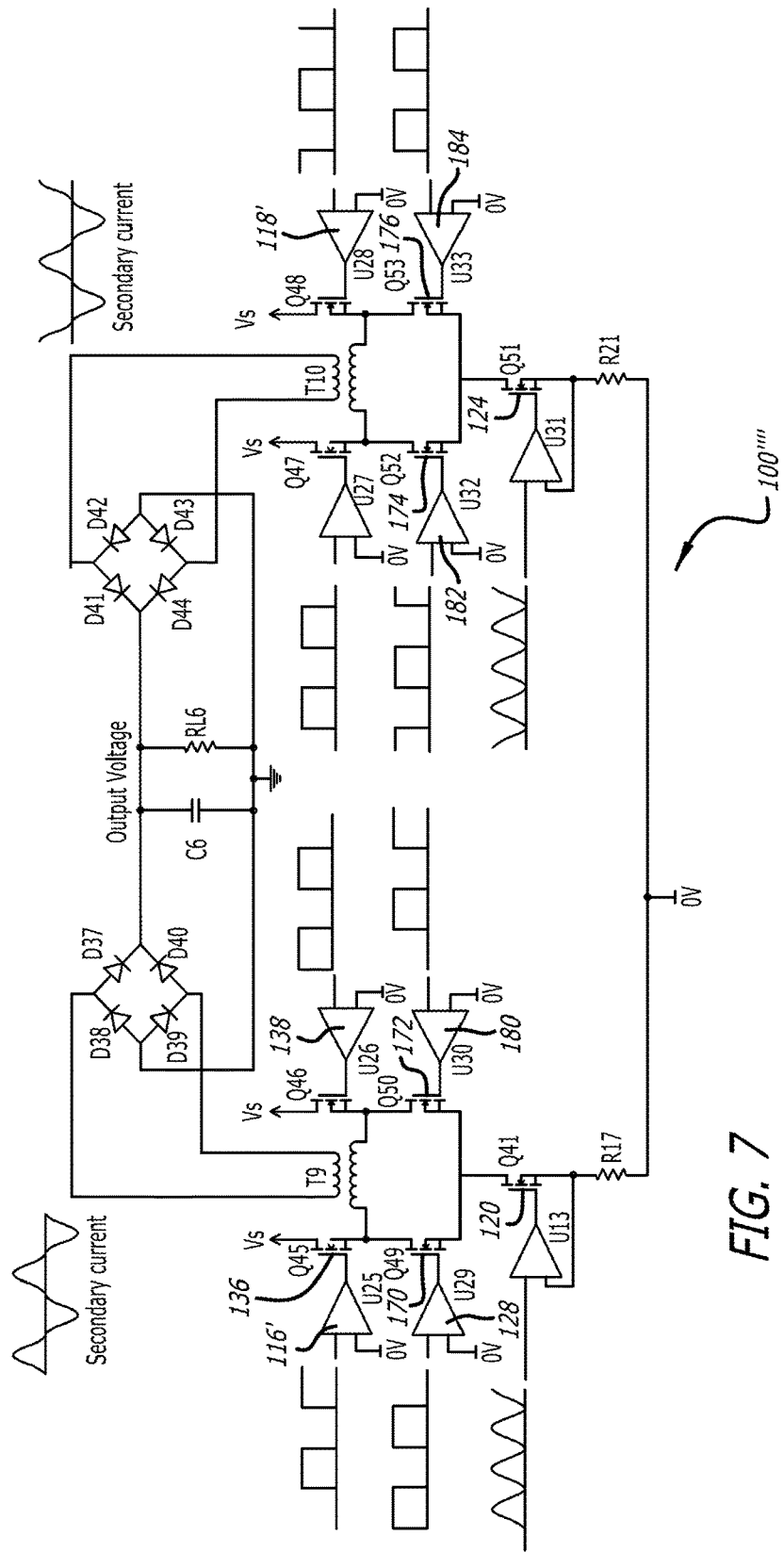
FIG. 7 is a schematic of another alternative embodiment of the power supply.

FIG. 7 shows another alternative embodiment 100'''' of the power supply, wherein the coupling circuits 116' and 118' have additional FET transistors 170, 172, 174 and 176 and operational amplifiers 178, 180, 182 and 184. Operation is similar to the power supply show in FIG. 2. Transistors 136 and 172 are ON and transistors 138 and 170 are OFF and then switched so that transistors 138 and 170 are ON and transistors 136 and 172 are OFF. Coupling circuit 118' operates in the same manner. In this embodiment, both the transformer switching and the current control are performed on the primary side. Although the voltages are often higher on the primary side of a DC-DC converter, the action of the mode of operation of this topology is such that the voltage that appears across current control transistors 120 and 124 is still very much lower than the primary supply voltage so that transistors 120 and 124 can still be optimised for linear current control. Such a configuration can be useful when maximum efficiency is desired or where it is the drain voltage of transistors 120 and 124 that is controlled.

Both the transformer switching and the current control are performed on the primary side. Although the voltages are often higher on the primary side of a DC-DC converter, the action of the mode of operation of this topology is still that the voltage that appears across current control transistors 120 and 122 is still much lower than the primary supply voltage so that transistors 120 and 124 can be optimised for linear current control.

Such a configuration can be useful when maximum efficiency is desired or where it is the drain voltage of transistors 120 and 124 that is controlled—all of the drive and control circuitry is then on the primary side of the transformer.

Figure 8:
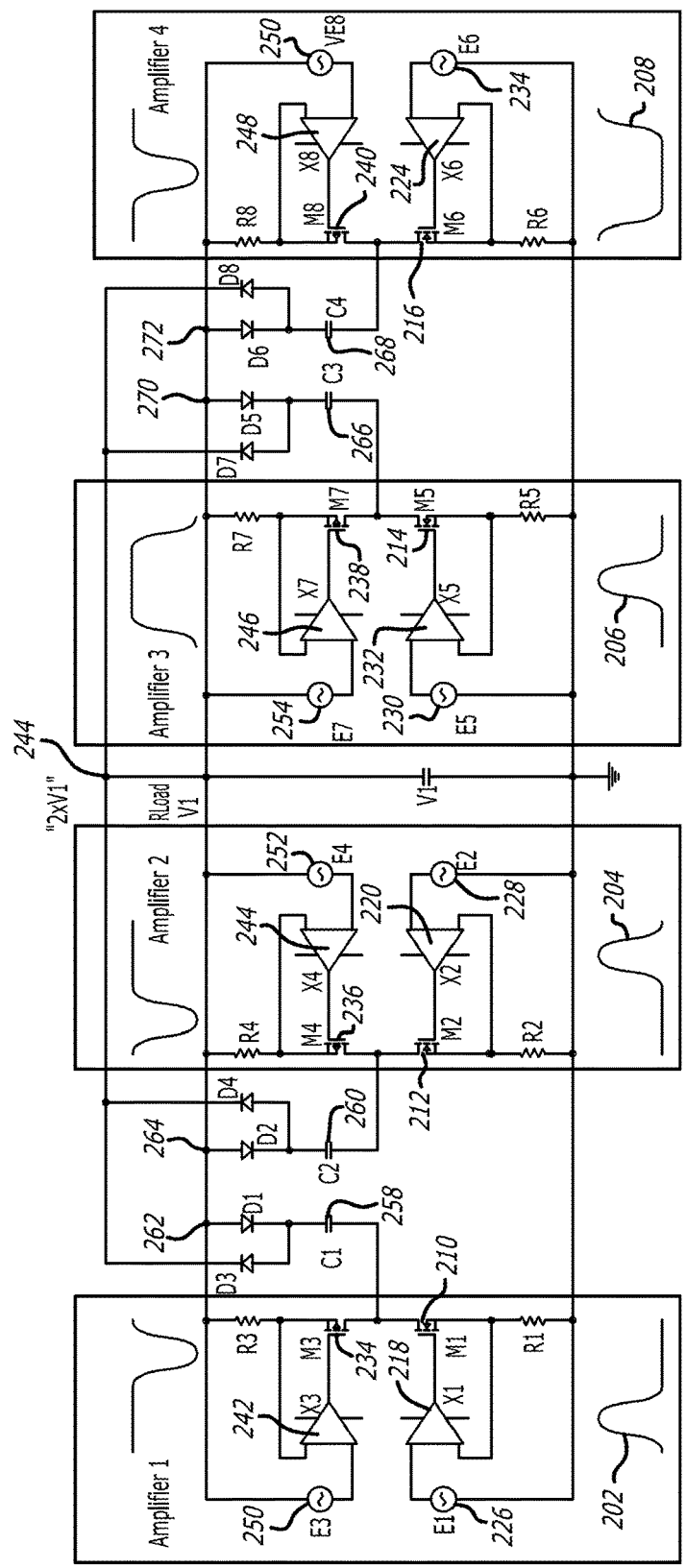
FIG. 8 is a schematic of a power supply with a voltage boost capability.

FIG. 8 shows an embodiment of a power supply 200 that provides a voltage boost. The power supply 200 includes four amplifier stages 202, 204, 206 and 208. Each amplifier stage includes charging FET transistors 210, 212, 214 and 216 connected to operational amplifiers 218, 220, 222, 224 and waveform generators 226, 228, 230 and 232. Each amplifier stage also includes discharging FET transistors 234, 236, 238 and 240 connected to operational amplifiers 242, 244, 246 and 248 and waveform generators 250, 252, 254 and 256. Amplifier stages 202 and 204 are connected to capacitors 258 and 260 and diode pairs 262 and 264. Likewise, amplifier stages 206 and 208 are connected to capacitors 266 and 268 and diode pairs 270 and 272. The power supply 200 is connected to a load 274 that is also connected to ground. The waveforms generated by the waveform generators are shown in FIG. 8. The waveforms are out of phase.

In operation, transistor 210 is on such that capacitor 258 is charged to a certain voltage. Then transistor 210 is turned OFF and transistor 234 is turned on so that the capacitor 258 is discharged to the load 274. The output of the capacitor 258 is added to the rail voltage V1 such that an additional voltage is applied to the load 274, thereby boosting the output voltage. The other amplifier stages 204, 206 and 208 operate in a similar manner to charge and discharge capacitors 260, 266 and 268. The timing of the amplifier stages 202 and 204 are such that one of the capacitors 258 or 260 is charging while the other capacitor 260 or 258 is discharging. Likewise the amplifier stages 206 and 208 charge and discharge capacitors 266 and 268 in an alternating manner. The waveforms of the stages 202, 204, 206 and 208 are offset so that a ripple free DC output is provided to the load 274.

Figure 9:
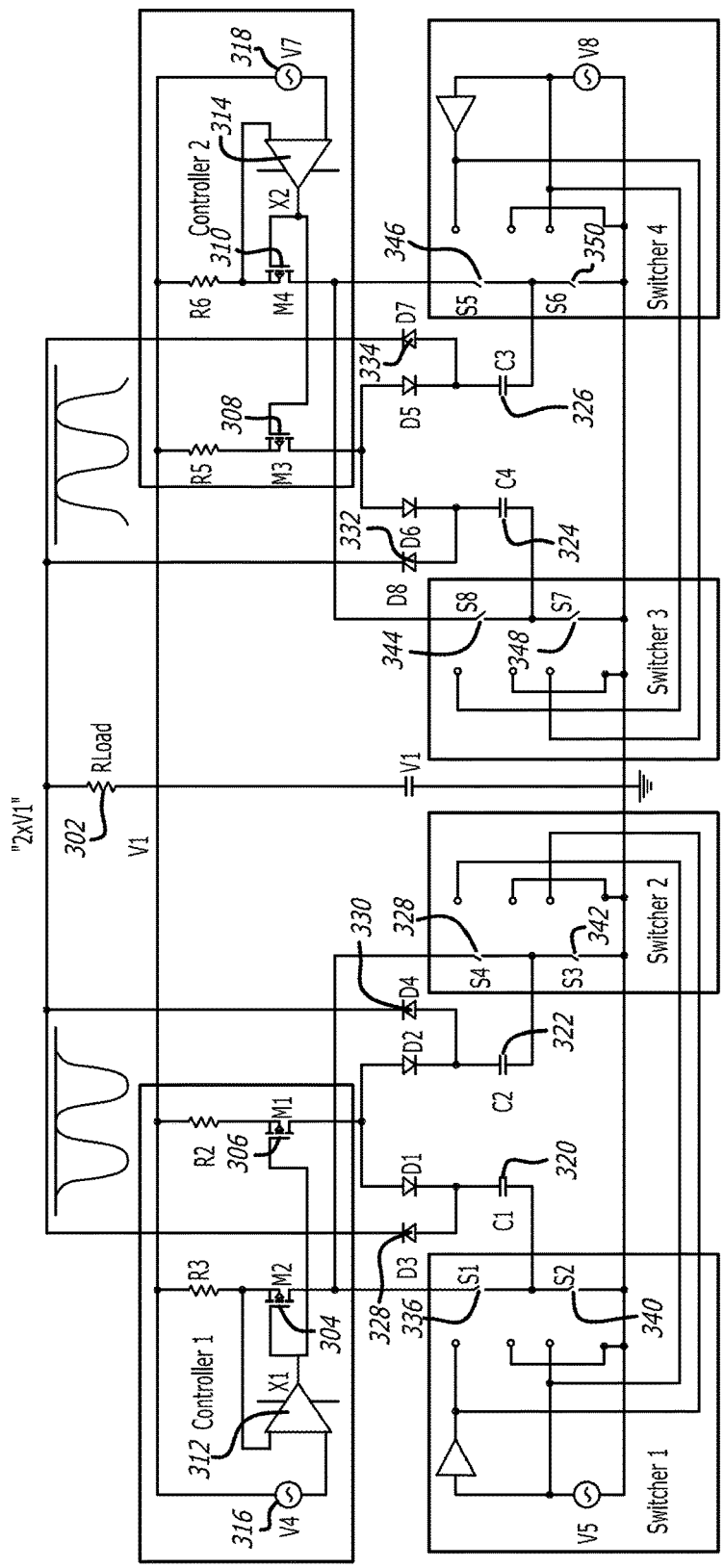
FIG. 9 is an alternate embodiment of the power supply shown in FIG. 8.

FIG. 9 is an embodiment of a power supply 300 that provides a boost voltage to a load 302. The power supply 300 includes controller circuits that include FET transistors 304, 306, 308 and 310, operational amplifiers 312 and 314 and waveform generators 316 and 318. The controller circuits are coupled to capacitors 320, 322, 324 and 326 and diode pairs 328, 330, 332 and 334. The power supply also includes a plurality of switches 336, 338, 340, 342, 344, 346, 348 and 350.

In operation, switches 338 and 340 are ON and switches 336 and 342 are OFF. Transistors 304 and 306 are also ON and define the waveform of the current flow into capacitor 320. In this state capacitor 320 is charged and capacitor 322 is discharged. Switches 336 and 342 are then turned ON and switches 338 and 340 are turned OFF. Transistors 304 and 306 are also ON and again define the waveform of the current flow into the capacitor 322. In this state capacitor 320 discharges to the load 302. The voltage of the capacitor is added to the rail voltage to provide an increased voltage to the load 302. During this state capacitor 322 is charged. This sequence continues wherein capacitors 320 and 322 are alternately charging and discharging. The transistors and circuits on the right hand side of the circuit operate in the same manner wherein capacitors 324 and 326 are charging and discharging in an alternating manner. The waveform provided by the right hand side of the circuit is offset by ¼ cycle from the waveform provided by the left hand circuit so that there is a ripple free DC output.

This embodiment eliminates some of the FET transistors required for the power supply shown in FIG. 8. The embodiment of FIG. 9 also only requires 2 operational amplifiers as opposed to the 8 op amps required in the embodiment of FIG. 8. By utilizing switches, the charge and discharge of the capacitors can be controlled by a unipolar current controller. Moreover, the defined current is identical for each of the devices controlling the charge and discharge cycles thus simplifying the control circuitry. The current waveform is also simpler being, in effect, an offset sinewave.

The basic Eulcap configuration shown in FIG. 8 comprises four phases of charge and discharge in order to obtain both ripple free input and ripple free output. Under such operating conditions, output storage capacitance can be dispensed with (in the ideal case—in practice some capacitance will be required in order to smooth out ripple caused by imperfections). However, there may be applications where output storage capacitance is required for other reasons and in this case it may be acceptable to then compromise on the inherent output ripple current cancellation nature of the converter and dispense with two of the four phases. This would entail eliminating amplifiers 242 and 244 and their associated capacitors and diodes. With this reduced configuration, the output current delivered to the load will be a continuous raised cosine wave and will therefore rely on output storage for smoothing to a low ripple DC output. The input current will however still retain the inherent ripple free nature of the standard EulCap converter.

This reduction exercise can be taken further still. If only amplifier 218 and associated diodes and capacitors are used, then both the input and output current are in the form of raised cosines and will therefore require capacitive filtering. However, the harmonic content of the waveforms will be low compared to the current spikes inherent in standard switched capacitor designs and so there is still a considerable benefit to this mode of operation.

A limitation of the Euler principle with respect to efficiency is the ripple voltage induced on the primary side square wave voltage due to leakage inductance in the transformer. With the Euler waveform shapes shown in FIGS. 4A-G, this manifests itself as an inverted sine component at twice the square wave frequency on top of the square wave. This ripple current limits how close the amplifier output can swing to ground or the rail voltage without clipping and so introduces linear losses. To minimize these losses, the leakage inductance has to be kept low, typically 1/2,000 to 1/10,000 of the primary magnetisation inductance.

This ripple voltage can be reduced by including a tuning network in series with the transformer primary or secondary. This tuning network can comprise a single capacitor or a more complex network of impedance elements. The purpose of the network is to reduce the parasitic impedance seen at the Drain of the current control driving transistor in order to reduce the voltage drop caused by the transformer parasitic impedance (such as leakage inductance) and the Euler current.

If a single capacitor is used, the capacitor is tuned to partially resonate with the leakage inductance to partially cancel out the ripple voltage. Full ripple cancellation is not possible with a single capacitor since the Euler waveform is not a sine wave, but sufficient ripple reduction can be obtained such that the dissipation in the driving transistor is significantly reduced.

With a more complex tuning network, which may for example comprise a series tuned LC network across a parallel resistor/capacitor, placed in series with the transformer primary or secondary the ripple can be further reduced.

The tuning network can be used to minimise power losses in the system for a given transformer and its leakage inductance or to reduce the leakage inductance requirements for a given acceptable loss in the driving transistors.

Figure 10:
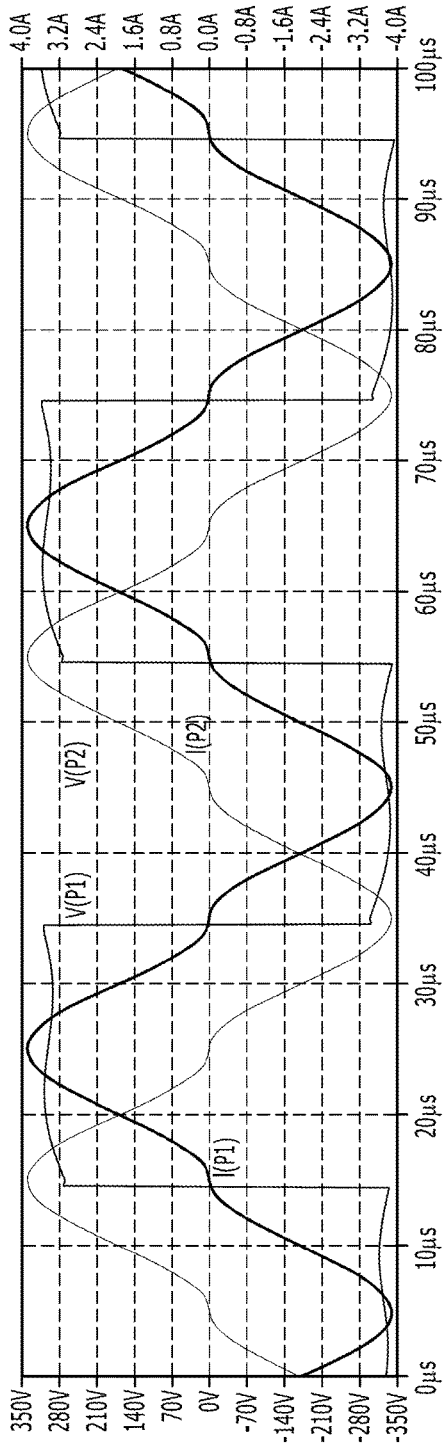
FIG. 10 is a graph showing various waveforms of power supply with a tuned capacitors coupled to the transformers; and, FIG. 11 is a graph showing various waveforms of a power supply with an impedance network coupled to the transformers.

FIG. 10 illustrates sample waveforms. V(P1) represent the primary voltage of a first phase of the Euler, V(P2) represents the primary voltage of a second phase. I(P1) and I(P2) are the respective primary current waveforms. In the phase 1 circuit, a partial cancellation of the ripple has been achieved with a suitably chosen capacitor whereas in the phase 2 circuit, no such capacitance is used. The reduction in the overall voltage ripple is clear.

In the phase 1 circuit, a partial cancellation of the ripple has been achieved with a suitably chosen capacitor whereas in the phase 2 circuit, no such capacitance is used. It can be seen that there is a reduction in the overall voltage ripple.

Figure 11:
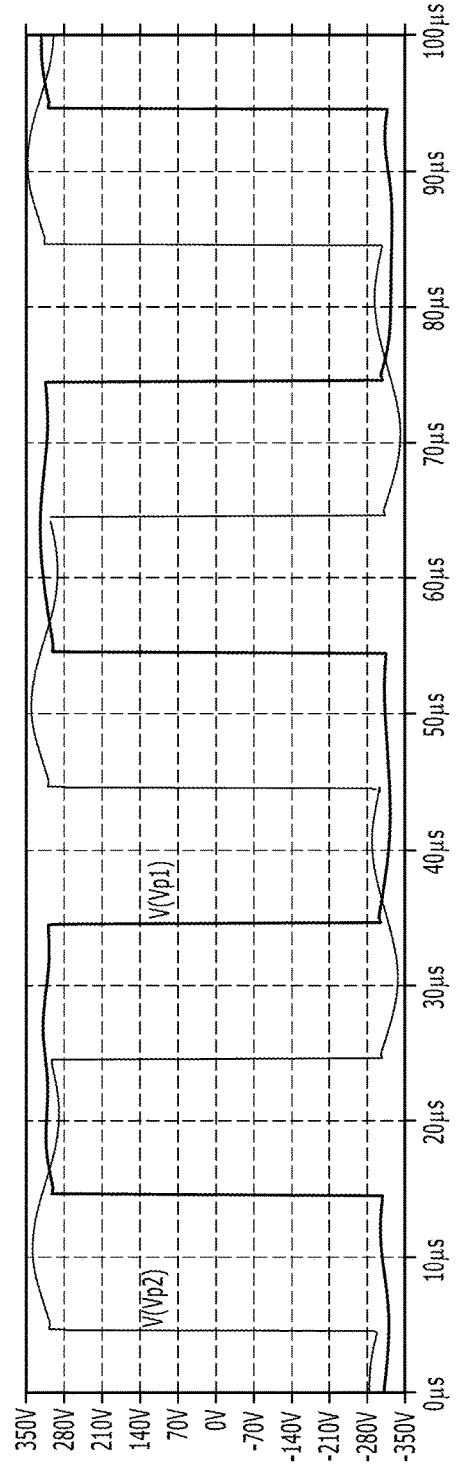

FIG. 11 shows the further ripple reduction possible with a more complex impedance network placed in series with the transformer primary. This network includes a series capacitor and an inductor placed in parallel with a further resistor and a further capacitor. As with FIG. 10, V(P1) represents the primary voltage of a first phase with the ripple reduction network and V(P2) represents the second phase without the ripple reduction network. An even greater ripple reduction effect is observed.

Although the tuning capacitance has been described as being in series with the primary winding(s) of the transformer, a suitably sized capacitance could be used on the secondary side instead.

This principle of ripple reduction by means of partial tuning out of the parasitic elements can be employed with the embodiment shown in FIG. 8 as well. In this case, a small inductor can be placed in series with each of the capacitors 258, 260, 266 and 268 to reduce the ripple voltage at the control transistor outputs. With suitable choice of capacitor, this inductor might be implemented as the inherent parasitic inductance of the capacitor itself. If not, the inductances might be constructed as PCB coils. As with the Euler transformer based approach, further ripple reduction can be achieved with the EulCap by employing more complex impedance networks.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A power supply, comprising:
a first transformer that has a first primary winding and a first secondary winding;
a second transformer that has a second primary winding and a second secondary winding;
a first current generator circuit that is coupled to said first transformer and generates a first waveform, said first current generator circuit receives a first analog input;
a first rectifier circuit that rectifies said first waveform;
a second current generator circuit that is coupled to said second transformer and generates a second waveform that is out of phase 90 degrees with said first waveform, said second current generator circuit receives a second analog input;
a second rectifier circuit that rectifies said second waveform;
a combiner that combines said first and second rectified waveforms into a DC output signal;
a first coupling circuit that couples said first current generator circuit to said first transformer; and,
a second coupling circuit that couples said second current generator circuit to said second transformer.

2. The power supply of claim 1, wherein said first current generator circuit includes a first current generator transistor and a second current generator transistor, said first coupling circuit includes a first switching transistor connected to said first current generator transistor, and a second switching transistor connected to said second current generator transistor, said power supply operates such that said first switching transistor and said second current generator transistor are ON and said second switching transistor and said first current generator transistor are OFF in a first state, and said first switching transistor and said second current generator transistor are OFF and said second switching transistor and said first current generator transistor is ON in a second state.

3. The power supply of claim 1, wherein said first current generator circuit and said first coupling circuit are coupled to said primary winding of said first transformer, and said second current generator circuit and said second coupling circuit are coupled to said primary winding of said second transformer.

4. The power supply of claim 1, wherein said first current generator circuit is coupled to said secondary winding of said first transformer and said first coupling circuit is coupled to said primary winding of said first transformer, and said second current generator circuit is coupled to said secondary winding of said second transformer and said second coupling circuit is coupled to said primary winding of said second transformer.

5. The power supply of claim 1, wherein said first current generator circuit includes a first current generator transistor, said first coupling circuit includes a first switching transistor, a second switching transistor, a third switching transistor and a fourth switching transistor coupled to said first current generator transistor, said power supply operates such that said first switching transistor and said third switching transistor are ON and said second switching transistor and said fourth switching transistor are OFF in a first state, and said first switching transistor and said third switching transistor are OFF and said second switching transistor and said fourth switching transistor are ON in a second state.

6. The power supply of claim 1, further comprising at least one first tuning element connected to said first primary winding and at least one second tuning element connected to said second primary winding.

7. The power supply of claim 2, wherein said first and second switching transistors are connected to said primary winding of said first transformer and a rail voltage.

8. The power supply of claim 4, wherein said first and second rectifier circuits each include a pair of diodes.

9. The power supply of claim 4, wherein said first and second rectifier circuits include switches and an output of said power supply is coupled to said first and second primary windings.

10. A method for power conversion, comprising:
generating with a first current generator circuit, that receives a first analog input, a first waveform that flows through a first transformer that has a first primary winding and a first secondary winding;
rectifying said first waveform;
generating with a second current generator circuit, that receives a second analog input, a second waveform that flows through a second transformer that has a second primary winding and a second secondary winding, said second waveform being out of phase 90 degrees with said first waveform;
rectifying said second waveform;
combining said first and second rectified waveforms into a DC output signal;
controlling with a first coupling circuit the coupling of said first current generator circuit to said first transformer; and,
controlling with a second coupling circuit the coupling of said second current generator circuit to said second transformer.

11. The method of claim 10, wherein said first current generator circuit includes a first current generator transistor and a second current generator transistor, said first coupling circuit includes a first switching transistor connected to said first current generator transistor, and a second switching transistor connected to said second current generator transistor, said power supply performs the steps of operating in a first state such that said first switching transistor and said second current generator transistor are ON and said second switching transistor and said first current generator transistor are OFF, and operating in a second state such that said first switching transistor and said second current generator transistor are OFF and said second switching transistor and said first current generator transistor is ON.

* * * * *